United States Patent [19]
Jung

[11] Patent Number: 5,993,007
[45] Date of Patent: Nov. 30, 1999

[54] REFLECTION TYPE PROJECTOR

[75] Inventor: Myung-ryul Jung, Suwon, Rep. of Korea

[73] Assignee: Samsung Electronics Co., Ltd., Kyungki-do, Rep. of Korea

[21] Appl. No.: 09/063,184

[22] Filed: Apr. 21, 1998

[51] Int. Cl.$^6$ .................................................. G03B 21/14
[52] U.S. Cl. ................................ 353/34; 353/20; 353/81
[58] Field of Search ............................... 353/20, 30, 31, 353/33, 34, 37, 81, 84; 349/5, 8, 9; 359/639, 640, 837

[56] References Cited

U.S. PATENT DOCUMENTS

| | | | |
|---|---|---|---|
| 5,601,351 | 2/1997 | Van Den Brandt | 353/20 |
| 5,626,408 | 5/1997 | Heynderickx et al. | 353/20 |
| 5,706,063 | 1/1998 | Hong | 349/9 |
| 5,716,122 | 2/1998 | Esaki et al. | 353/20 |
| 5,826,960 | 10/1998 | Gotoh et al. | 349/9 |

*Primary Examiner*—William Dowling
*Attorney, Agent, or Firm*—Sughrue, Mion, Zinn, Macpeak & Seas, PLLC

[57] ABSTRACT

A reflection type projector is disclosed by which efficiency of the use of light can be increased using a birefringent prism. A reflection type projector includes a light source for emitting light, a first and second imaging mechanism for forming an image from the rays emitted from the light source and reflecting the formed image, a projection lens unit for magnifying the image formed by the first and second imaging mechanism and projecting the magnified image onto a screen, first and second prisms, disposed opposite each other along the optical path of the light, for separating an incident light into an ordinary ray and an extraordinary ray and changing a proceeding path of the light such that the ordinary and extraordinary rays have different optical paths, and first and second phase delay plates, disposed along the optical path of the light between the first and second birefringent prisms and the first and second imaging means, for delaying the phase of the incident ray to change property of polarization thereof.

10 Claims, 3 Drawing Sheets

REFLECTION TYPE PROJECTOR

BACKGROUND OF THE INVENTION

1. Field of the Invention

The present invention relates to a reflection type projector, and more particularly, to a reflection type projector employing birefringent prisms to increase the efficiency of the use of light.

2. Description of the Related Art

A projector is generally known as an apparatus for projecting an image formed by an image forming means using an additional illuminating apparatus.

FIG. 1 shows a conventional reflection type projector. The conventional reflection type projector includes a light source 10 for emitting light, a color wheel 20 for selectively transmitting a predetermined color of an incident light, such as a red, green, or blue color, a scrambler 30 for mixing rays of the incident beam having different degrees of intensity into a uniform beam, a focusing lens 32, a collimating lens 34, a polarization beam splitter (PBS) 40 for changing the proceeding path of an incident beam, a display device 50 for forming an image by selectively reflecting the incident beam, and a projection lens unit 60 for projecting the incident beam onto a screen (not shown).

The light source 10 is comprised of a lamp 11 for generating rays of light, such as a metal haloid lamp or a xenon arc lamp, and a reflecting mirror 13 for reflecting light emitted from the lamp 11 in a proceeding path. The color wheel 20 is installed along the optical path of the light between the light source 10 and the scrambler 30 and can be rotated by a driving motor 21. Red (R), green (G) and blue (B) color filters 22 are arranged on equal areas of the color wheel 20, respectively. The color wheel 20 rotates corresponding to a response speed of a displaying device. Any one of R, G and B of the color wheel 20 is positioned to coincide with the optical path of the light.

The scrambler 30 mixes the incident beam by diffusely reflecting the same such that the rays of the incident beam are changed into rays of uniform light intensity. The focusing lens 32 focuses and diverges the beam having passed through the scrambler 30 such that the diameter of the beam transmitted is enlarged. The collimating lens 34 changes the diverging beam into a parallel beam.

The polarization beam splitter 40 is disposed along the optical path of the light between the collimating lens 34 and the display device 50 and changes a proceeding path of the incident beam by selectively transmitting or reflecting the incident beam at a mirror surface 41 according to a polarization component thereof. That is, the light traveling from the side of the light source 10 is selectively transmitted or reflected depending on whether the polarization component of the beam is a P-polarized beam or an S-polarized beam.

FIG. 1 shows an example in which the beam passing through the polarization beam splitter 40 is used as an effective light. A ferroelectric liquid crystal display (FLCD) of a two dimensional array structure exhibiting a superior response speed is employed as the display device 50. The display device 50 has a plurality of reflection areas of a two dimensional array structure. The reflection areas, each being independently driven, together form an image by modulating polarization directions of the rays of the incident beam.

The beam incident on the display device 50 is reflected again and reenters the polarization beam splitter 40. Here, the beam reentering the polarization beam splitter 40 has a polarization direction which is changed by 90° by the display device 50. Then, the beam is totally reflected by the mirror surface 41 of the polarization beam splitter 40 and proceeds toward the projection lens unit 60. The beam is projected onto the screen via the projection lens unit 60.

However, in the conventional reflection type projector, since a beam of one polarization direction of an incident beam, which is dichotomized depending on the polarization direction thereof, is used as an effective light, efficiency of use of the light is reduced. Also, the reduced light-use efficiency becomes a hindrance in realizing a reflection type projector requiring high brightness.

SUMMARY OF THE INVENTION

To solve the above problem, it is an objective of the present invention to provide a reflection type projector employing a pair of birefringent prisms instead of a polarization beam splitter so that the efficiency in the use of light emitted from a light source increases.

Accordingly, to achieve the above objective, there is provided a reflection type projector including a light source for emitting light, first and second imaging units for forming an image from the rays emitted from the light source and reflecting the formed image, a projection lens unit for magnifying the image formed by the first and second imaging units and projecting the magnified image onto a screen, first and second prisms, disposed opposite each other along the optical path of the light, for separating an incident light into an ordinary ray and an extraordinary ray, and changing a proceeding path of the light such that the ordinary and extraordinary rays have different optical paths, and first and second phase delay plates, disposed along the optical path of the light between the first and second birefringent prisms and the first and second imaging units, for delaying the phase of the incident ray to change the property of polarization thereof.

It is preferable in the present invention that a color selection unit, disposed along an optical path between the light source and the projection lens unit to select color by selectively transmitting an incident ray according to wavelength thereof is further included.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
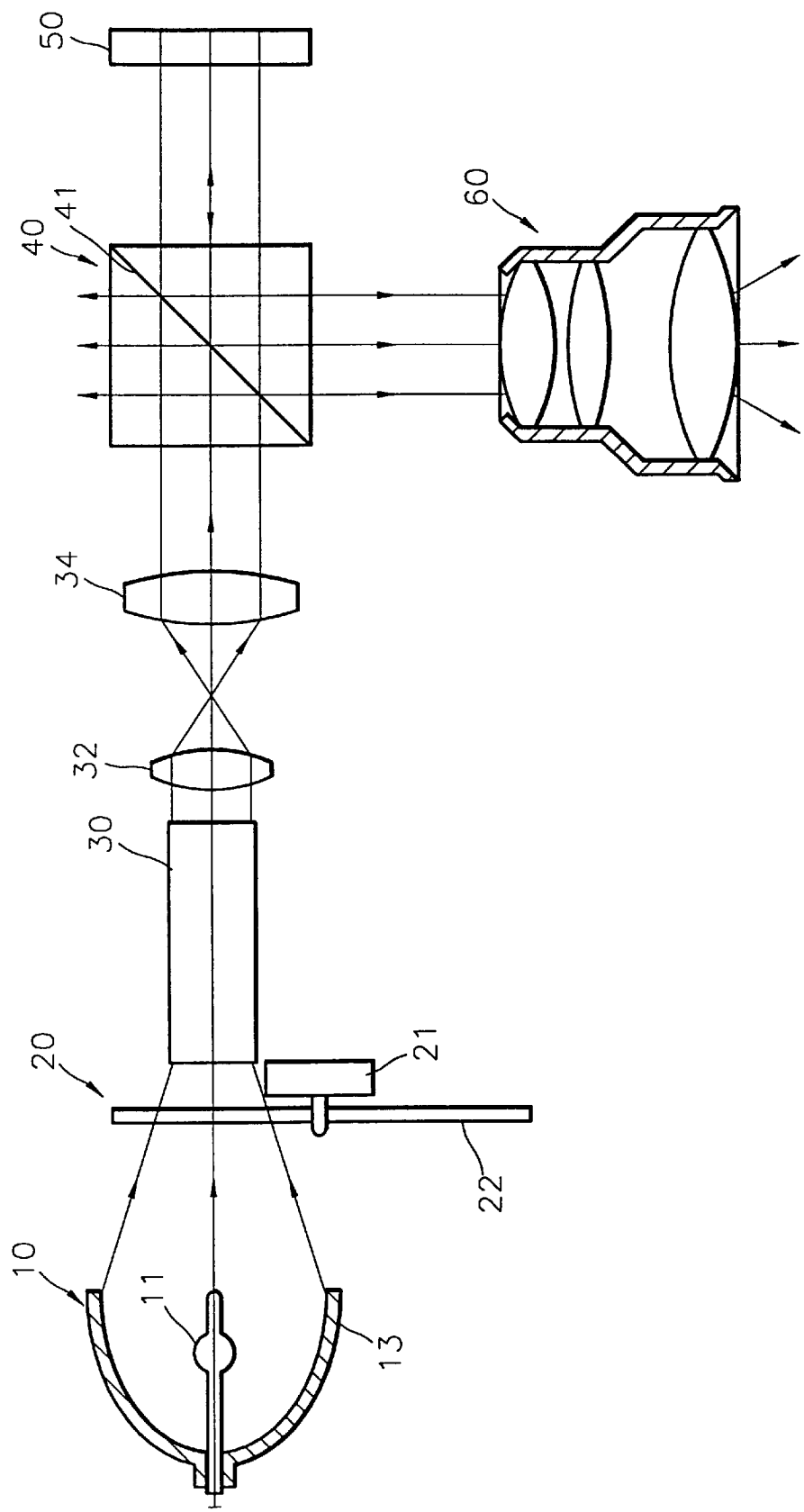
FIG. 1 is a view schematically showing the optical arrangement of a conventional reflection type projector.
Figure 2:
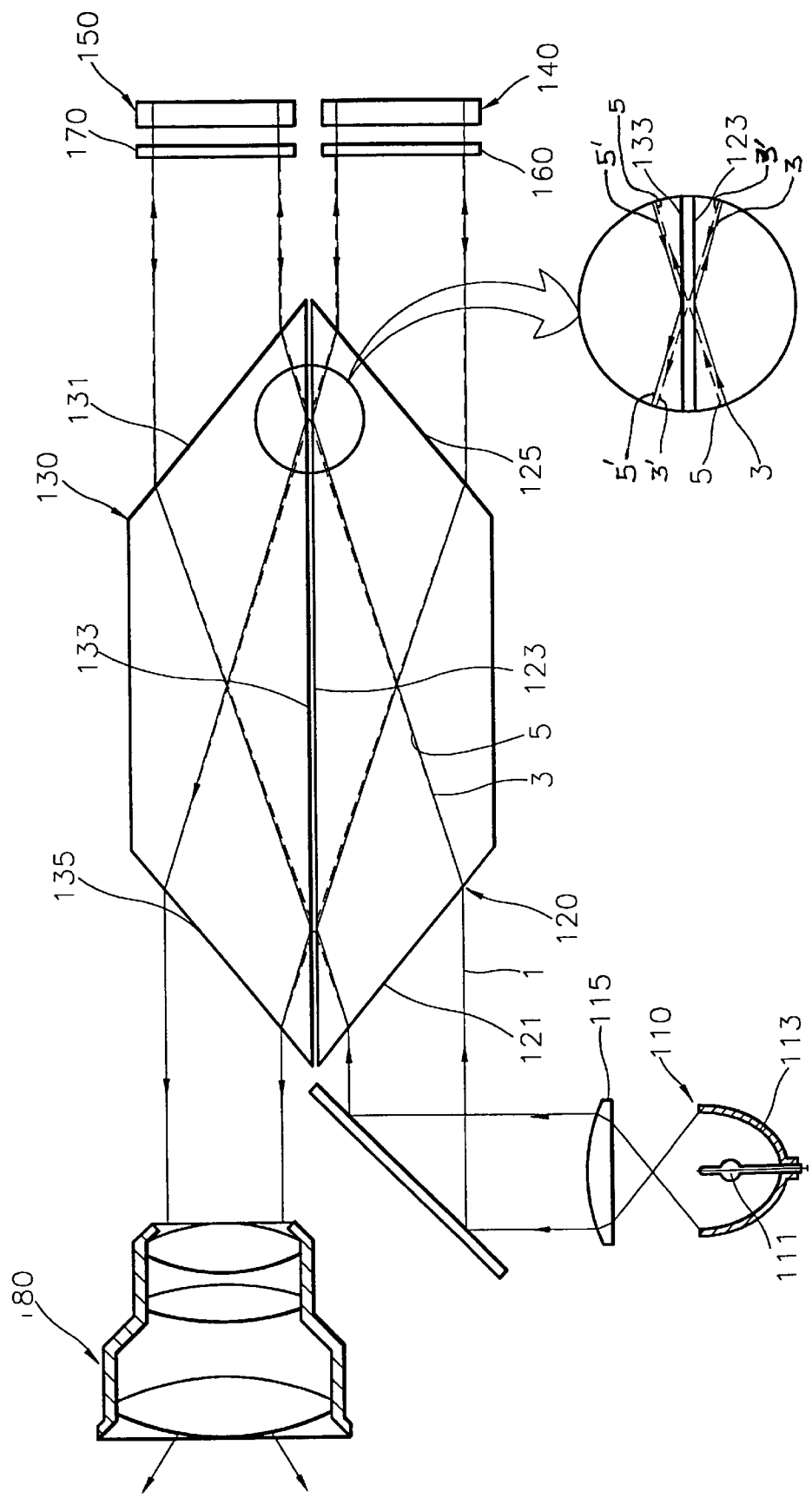
FIG. 2 is a view schematically showing the optical arrangement of a reflection type projector according to a preferred embodiment of the present invention.

Referring to FIG. 2, a reflection type projector according to a preferred embodiment of the present invention includes a light source 110, first and second birefringent prisms 120 and 130 for changing the proceeding path of the light emitted from the light source 110, first and second imaging means 140 and 150 for forming an image from an incident light and selectively reflecting the same, first and second phase delay plates 160 and 170 disposed along the optical path of the light for delaying the phase of the incident light, and a projection lens unit 180 for magnifying the incident light and projecting the same onto a screen (not shown).

The light source 110 includes a lamp 111 for generating light and a reflecting mirror 113 for reflecting rays of the light emitted from the lamp 111 in a proceeding path of the light. The reflecting mirror 113 can be an oval mirror having one focus at the position of the lamp 111 and the other focus at the position where the light focuses, or a parabolic mirror focusing at the position of the lamp Ill and making the light reflected from a reflection surface thereof into a parallel beam. In FIG. 2, an oval mirror is employed as the reflecting mirror 113, in which a collimating lens 115 is further included to make the light emitted from the light source 110 and reflected from the oval mirror into a parallel beam.

The first and second birefringent prisms 120 and 130 are disposed along the optical path of the light to face each other and change the proceeding path of an incident light 1 which is birefringent to thereby be broken down into an ordinary ray 3 and an extraordinary ray 5 according to crystallization direction thereof. Here, the ordinary ray 3 has the same refractive index and a uniform proceeding speed of the light regardless of the direction of the crystalline optical axes of the first and second birefringent prisms 120 and 130. Whereas the extraordinary ray 5 has a varying proceeding speed according to the direction of the crystalline optical axes of the first and second birefringent prisms 120 and 130 so that the refractive index of the light varies according to the direction of an incident light with respect to the crystalline optical axis.

The first birefringent prism 120 is disposed along the optical path between the light source 110 and the first imaging means 140, and has an incident surface 121, a first critical surface 123 and a first incident/exit surface 125. At the incident surface 121, an incident ray 1 from the light source 110 being birefringent is separated into an ordinary ray 3 and an extraordinary ray 5, to thus have different optical paths. The incident ordinary ray 3 is reflected from the first critical surface 123, while the extraordinary ray 5 passes through the same. The first incident/exit surface 125 is installed to be at an angle with respect to the first imaging means 140 such that an incident ray refractively passes through the same. Preferably, the first birefringent prism 120 is a trapezoidal block having the first critical surface 123 as the upper surface.

Here, the angles of inclination of the incident surface 121 and the first incident/exit surface 125 are determined depending on the respective refractive angles of the ordinary ray 3 and the extraordinary ray 5 and the critical angle of the first critical surface 123. That is, the ordinary ray 3 incident on the first critical surface 123 beyond the critical angle thereof is totally reflected at the first critical surface 123. Whereas the extraordinary ray 5 being incident at an angle less than the critical angle of the first critical surface 123 refractively passes through the first critical surface 123. Both the ordinary ray 3 and the extraordinary ray 5 are rays of linear polarization which are perpendicular to each other.

The second birefringent prism 130 has a second critical surface 133, a second incident/exit surface 131 and an exit surface 135. Preferably, the second birefringent prism 130 is a trapezoidal block whose bottom surface is the second critical surface 133. The second critical surface 133 is disposed opposite the first critical surface 123. The incident extraordinary ray 5 having passed through the first birefringent prism 120 refractively passes through the second critical surface 133. An incident ordinary ray 5', whose birefringence property has been changed after passing through the second phase delay plate 170 and the second imaging means 150, is reflected from the second critical surface 133. The second incident/exit surface 131 is installed to be at an angle with respect to the second imaging means 150 so that the incident rays transmit at different refractive angles according to the birefringence property thereof. The exit surface 135 is installed to be at an angle with respect to the optical axis of the exit beam so that the incident rays, which are reflected from the first and second imaging means 140 and 150 and pass through the first and second incident/exit surfaces 125 and 131 and the first and second critical surfaces 123 and 133, are refractively transmitted to proceed toward the projection lens unit 180.

While passing through the first and second birefringent prisms 120 and 130, the ordinary ray 3, 5' is reflected by the first and second critical surfaces 123 and 133 and the extraordinary ray 3', 5 passes through the same. However, an alternative mechanism can be used, that is, the extraordinary ray can be reflected from the first and second critical surfaces 123 and 133 while the ordinary ray passes through the same. The property of birefringence of the respective first and second birefringent prisms 120 and 130 is determined depending on the material thereof.

The first phase delay plate 160 is disposed along the optical path between the first incident/exit surface 125 and the first imaging means 140, and the second phase delay plate 170 is disposed along the optical path between the second incident/exit surface 131 and the second imaging means 150. The first and second phase delay plates 160 and 170 each change polarization directions by delaying the phase of the incident ray. Here, it is preferable that the first and second phase delay plates 160 and 170 are $\lambda/4$ plates which can change an incident ray of linear polarization into a ray of circular polarization, or an incident ray of circular polarization into a ray of linear polarization.

The first imaging means 140 forms an image from an incident ray refractively transmitted through the first incident/exit surface 125 and passing through the first phase delay plate 160 and again reflects the image toward the first incident/exit surface 125. The second imaging means 150 forms an image from an incident ray refractively transmitted through the second incident/exit surface 131 and passing through the first phase delay plate 170 and again reflects the image.

To achieve the above purpose, it is preferable that the first and second imaging means 140 and 150 are ferroelectric liquid crystal display (FLCD) including pixels of a two dimensional array structure each being independently driven.

In the FLCD, a ray reflected by a pixel which is driven and a ray reflected by a pixel which is not driven have different polarization directions with respect to an incident ray having the same polarization direction. For instance, when an ordinary ray proceeding to the first incident/exit surface 125 falls on the FLCD after passing through the $\lambda/4$ plate, the ray reflected by the driven pixel is an extraordinary ray while the ray reflected by the not-driven pixel is an ordinary ray of which the polarization direction is not changed.

Alternatively, a digital mirror device (DMD) including mirrors of a two dimensional array structure can be employed in place of the FLCD as the first and second imaging means 140 and 150. In this case, each of the mirrors is independently driven and an image is formed by differentiating the angle of reflection with respect to an incident light.

Here, since the DMD and the FLCD are well known, the descriptions thereof will be omitted.

The projection lens unit 180 is disposed between the exit surface 135 of the second birefringent prism 130 and the screen, and projects toward the screen the image formed by the first and second imaging means 140 and 150 and passing through the first and second birefringent prisms 160 and 170 by magnifying the same.

Figure 3:
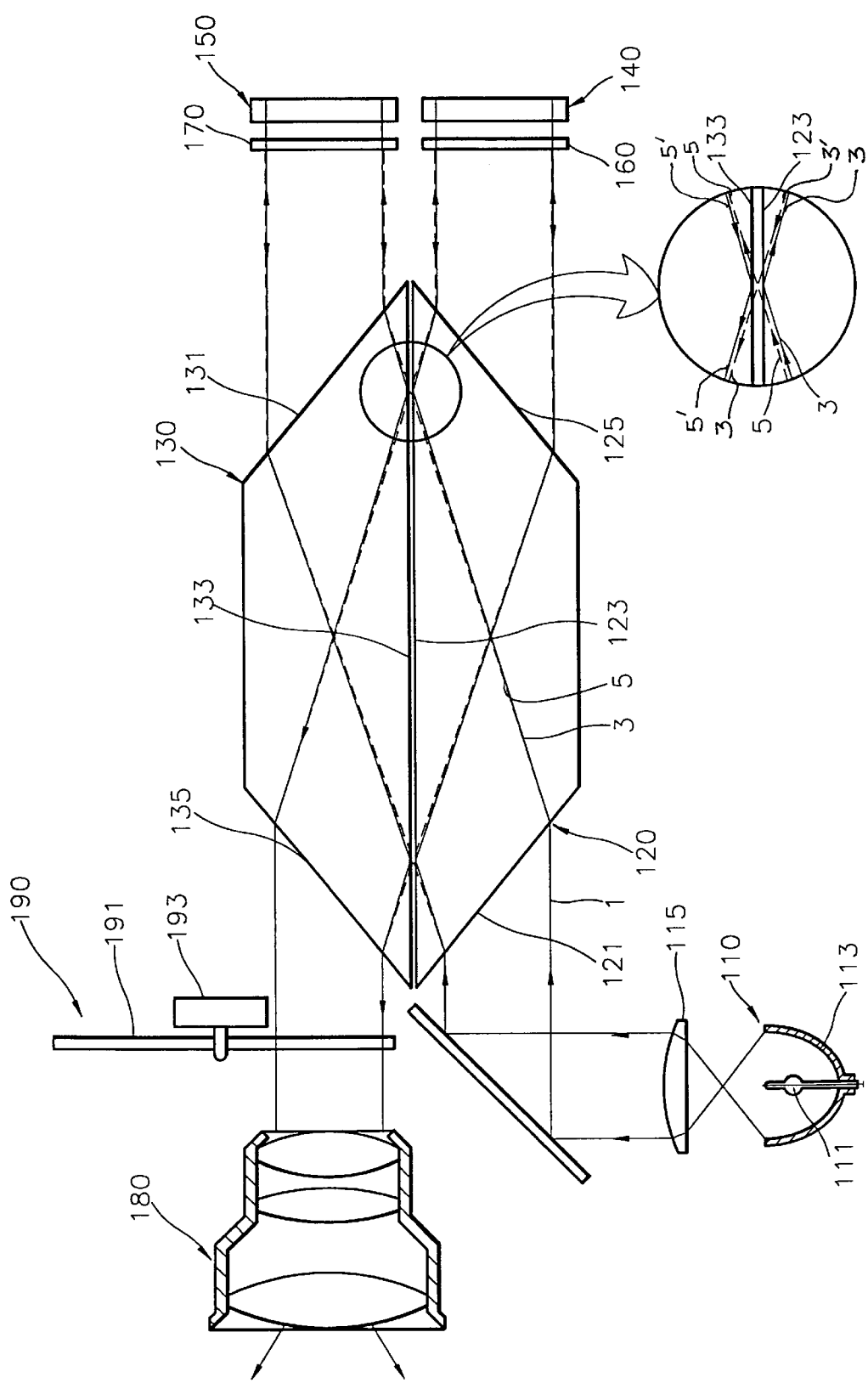
FIG. 3 is a view schematically showing the optical arrangement of a reflection type projector according to another preferred embodiment of the present invention.

FIG. 3 shows a reflection type projector according to another embodiment of the present invention. Here, since the same reference numerals indicate the same or similar elements in the previous embodiment, descriptions thereof will be omitted.

According to the characteristic feature of the present embodiment, a color selection means 190 for selecting colors in sequence is further provided along the optical path between the light source 110 and the projection lens unit 180 in order to embody a color image.

The color selection means 190 determines color by selectively transmitting an incident light depending on the wavelength thereof. To do so, the color selection means 190 preferably includes a color filter 191 disposed along the optical path, on which three colors of red (R), green (G) and blue (B), or yellow (y), cyan (C) and magenta (M), are arranged on equal areas, and a driving portion 193 for rotating the color filter 191. The color filter 191 is rotated by the driving portion 193 such that the respective three colors are arrayed to be coincident with the optical path. The color selection means 190 may be disposed along the optical path between the light source 110 and the first birefringent prism 120.

The operation of the reflection type projector according to the above embodiment of the present invention will now be described.

Light emitted from the lamp 111 and reflected from the reflecting mirror 113 becomes a parallel beam as it passes through the collimating lens 115. The ray 1 becomes birefringent at the incident surface 121 of the first birefringent prism 120 thereby being separated into an ordinary ray 3 and an extraordinary ray 5 having different proceeding paths.

The ordinary ray 3 refractively transmitting the incident surface 121 is incident on the first critical surface 123 at an angle greater than the critical angle thereof and then reflected, whereas the extraordinary ray 5 incident on the first critical surface 123 at an angle less than the critical angle thereof is refractively transmitted. The reflected ordinary ray 3 refractively passes through the first incident/exit surface 125. The refractively transmitted ray of linear polarization becomes a ray of circular polarization as it passes through the first phase delay plate 160. The ray is reflected by the first imaging means 140 to have a selective polarization direction depending on whether the respective pixels of the first imaging means 140 are driven or not. The reflected ray again becomes a ray of linear polarization as it passes through the first phase delay plate 160. Here, the ray reflected by the driven pixel of the first imaging means 140 becomes an extraordinary ray having the polarization direction thereof changed by 90°, whereas the ray reflected by the pixel which is not driven becomes an extraordinary ray 3' with an unchanged polarization direction. Thus, the ordinary ray 3 and the extraordinary ray 3' re-entering the first incident/exit surface 125 have different optical paths. The ordinary ray is reflected by the first critical surface 123 and the extraordinary ray passes through the first and second critical surfaces 123 and 133 and the exit surface 135 and proceeds toward the projection lens unit 180.

Meanwhile, the extraordinary ray 5 transmitting the incident surface 121 and the first critical surface 123 further passes through the second critical surface 133 and passes through the second incident/exit surface 131 and the second phase delay plate 170 to be incident upon the second imaging means 150. The polarization direction of the ray reflected by the second imaging means 150 is determined depending on whether the respective pixels thereof are driven. Thus, of the rays re-entering the second incident/exit surface 131 after being reflected from the second imaging means 150 and passing through the second phase delay plate 170, the ray reflected by the driven pixel has a polarization direction changed by 90° and thus becomes an ordinary ray 5' while the ray reflected from the pixel which is not driven remains the same as the extraordinary ray 5. Accordingly, the ordinary and extraordinary rays 5', 5 re-entering the second incident/exit surface 131 are split along different optical paths and refractively transmitted. The ordinary ray 5' is reflected by the second critical surface 133 and passes through the exit surface 135 to proceed toward the projection lens unit 180. The extraordinary ray 5 is transmitted through the second critical surface 133, the first critical surface 123 and the incident surface 121.

As described above, in the reflection type projector according to the embodiment of the present invention, the light emitted from a light source is completely used to increase the efficiency of the use of light. Also, it is very useful to exclude a polarization beam splitter which is sensitive to an incident angle of the light.

It is contemplated that numerous modifications may be made to the apparatus and procedure of the invention without departing from the spirit and scope of the invention as defined in the following claims.

What is claimed is:

1. A reflection type projector comprising:

a light source for emitting light;

first and second birefringent prisms, disposed opposite each other along an optical path of the light, for separating an incident light into an ordinary ray and an extraordinary ray and changing the proceeding path of the light such that the separated ordinary and extraordinary rays have different optical paths;

first and second imaging means, disposed corresponding to each of said first and second birefringent prisms, for forming an image from the rays emitted from said light source and respectively passing the rays through said first and second birefringent prisms and reflecting the formed image;

first and second phase delay plates, disposed along the optical path of the light between said first and second birefringent prisms and said first and second imaging means, for delaying the phase of the incident ray to change the polarization property thereof; and a projection lens unit, disposed to be adjacent to said second birefringent prism, for magnifying the incident rays formed by said first and second imaging means and passed through said first and second phase delay plates and said first and second birefringent prisms, respectively, and projecting the magnified ray onto a screen;

wherein said first birefringent prism comprises:

an incident surface, at an angle with respect to the optical axis of an incident ray which refracts the incident ray to be separated into an ordinary ray and an extraordinary ray each having different optical paths;

a first critical surface which transmits either one of said ordinary ray and said extraordinary ray and reflects the other ray; and a first incident/exit surface, disposed to be at an angle with respect to said first imaging means, which refractively transmits the incident ray;

wherein said second birefringent prism comprises:

a second critical surface, disposed opposite said first critical surface, which refractively transmits an incident ray having passed through said first birefringent prism and reflects an incident ray having a changed property of birefringence after passing through said second phase delay plate and said second imaging means;

a second incident/exit surface, disposed to be at an angle with respect to said second imaging means, which refractively transmits an incident ray; and an exit surface, disposed to be at an angle with respect to the optical axis, which refractively transmits incident rays reflected from said first and second imaging means and having passed through said first and second incident/exit surfaces and said first and second critical surfaces towards said projection lens unit.

2. The reflection type projector as claimed in claim 1, wherein said light source comprises:

a lamp, disposed opposite to said first birefringent prism, for generating and emitting light; and a reflecting mirror for reflecting the light emitted from said lamp to proceed in one direction.

3. The reflection type projector as claimed in claim 1, wherein said first birefringent prism is a trapezoidal block having said first critical surface as the upper surface.

4. The reflection type projector as claimed in claim 1, wherein said second birefringent prism is a trapezoidal block having said second critical surface as the bottom surface.

5. The reflection type projector as claimed in claim 1, wherein said first phase delay plate is a $\lambda/4$ plate which changes a ray of linear polarization to a ray of circular polarization and a ray of circular polarization to a ray of linear polarization by delaying the phase of an incident ray so that a property of birefringence of the incident ray is selectively changed according to the respective pixel areas of said first imaging means.

6. The reflection type projector as claimed in claim 1, wherein said second phase delay plate is a $\lambda/4$ plate which changes a ray of linear polarization to a ray of circular polarization and a ray of circular polarization to a ray of linear polarization by delaying the phase of an incident ray so that a property of birefringence of the incident ray is selectively changed according to the respective pixel areas of said second imaging means.

7. The reflection type projector as claimed in claim 1, wherein said first and second imaging means are ferroelectric liquid crystal displays, respectively disposed opposite said first and second phase delay plates and including pixels of a two dimensional array structure, each of the pixels being independently driven to select a direction of polarization, which form an image and reflect the formed image toward said first and second phase delay plates.

8. The reflection type projector as claimed in claim 1, wherein said first and second imaging means are digital mirror devices, respectively disposed opposite said first and second phase delay plates and including reflecting mirrors of a two dimensional array structure, each of the reflecting mirrors being independently driven to select a direction of reflection of an incident ray, which form an image and reflect the formed image.

9. The reflection type projector as claimed in claim 1, further comprising a color selection means which is disposed along an optical path between said light source and said projection lens unit to select color by selectively transmitting an incident ray according to wavelength thereof.

10. The reflection type projector as claimed in claim 9, wherein said color selection means comprises:

a plurality of color filters selectively disposed along an optical path to selectively transmit incident ray according to the wavelength thereof; and a driving source for rotating said color filter.

* * * * *